United States Patent
Veilleux, Jr. et al.

(10) Patent No.: US 9,467,083 B1
(45) Date of Patent: Oct. 11, 2016

(54) WOUND-FIELD GENERATOR INCLUDING ELECTRICALLY ISOLATED ENGINE ALTERNATOR

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/718,431

(22) Filed: May 21, 2015

(51) Int. Cl.
  H02P 9/10   (2006.01)
  H02P 9/14   (2006.01)
  H02P 9/38   (2006.01)
  H02P 11/00  (2006.01)

(52) U.S. Cl.
  CPC ........................... *H02P 9/38* (2013.01)

(58) Field of Classification Search
  USPC ...................................... 322/29, 59; 318/400
  See application file for complete search history.

(56) References Cited

U.S. PATENT DOCUMENTS

| | | | | |
|---|---|---|---|---|
| 4,949,021 A * | 8/1990 | Rozman | .................. | F02N 11/04 318/400.11 |
| 4,967,132 A * | 10/1990 | Rozman | .................. | H02P 1/46 318/723 |
| 5,029,263 A * | 7/1991 | Rozman | .................. | F02N 11/04 318/400.22 |
| 5,047,699 A * | 9/1991 | Rozman | .................. | F02N 11/04 318/400.07 |
| 5,512,811 A * | 4/1996 | Latos | .................. | F02N 11/04 318/400.13 |
| 6,195,247 B1 | 2/2001 | Côté et al. | | |
| 7,208,908 B2 * | 4/2007 | Anghel | .................. | H02P 9/009 318/400.02 |
| 7,312,550 B2 | 12/2007 | Dooley | | |
| 7,514,806 B2 * | 4/2009 | Xu | .................. | H02P 9/302 290/31 |
| 7,863,868 B2 * | 1/2011 | Xu | .................. | H02K 19/26 322/44 |
| 7,875,989 B2 | 1/2011 | Morris et al. | | |
| 7,915,869 B2 * | 3/2011 | Xu | .................. | H02K 7/20 322/59 |
| 8,085,004 B2 * | 12/2011 | Xu | .................. | H02K 19/26 290/31 |
| 8,358,111 B2 | 1/2013 | Rozman et al. | | |

(Continued)

FOREIGN PATENT DOCUMENTS

EP  2790320 A2  10/2014

*Primary Examiner* — Pedro J Cuevas
(74) *Attorney, Agent, or Firm* — Cantor Colburn LLP (57) ABSTRACT

An isolated power management system includes at least one electronic power generator with a stationary side and a rotational side. The stationary side has an exciter field stator winding, a main field stator winding, and an isolator stator winding. The rotational side rotates with respect to the stationary side and includes a rotor power converting unit. At least one digital engine microcontroller generates a first electrical excitation current and excites the exciter field stator winding to generate a first electromagnetic field. The rotor power converting unit generates a second electromagnetic field in response to being energized by the first electromagnetic field. The main field stator winding and the isolator stator winding output first and second power signals, respectively, in response to being energized by the second electromagnetic field, where the second power signal is independent and isolated from the first power signal.

15 Claims, 5 Drawing Sheets

(56) References Cited

U.S. PATENT DOCUMENTS

| | | | | |
|---|---|---|---|---|
| 2006/0006829 A1* | 1/2006 | Anghel | ................... | H02P 9/009 318/719 |
| 2008/0303280 A1* | 12/2008 | Xu | ................... | H02P 9/302 290/31 |
| 2008/0303490 A1* | 12/2008 | Xu | ................... | H02K 19/26 322/29 |
| 2009/0243417 A1* | 10/2009 | Xu | ................... | H02K 19/38 310/184 |
| 2011/0023447 A1* | 2/2011 | Veilleux | ................. | F01D 25/12 60/39.83 |
| 2011/0068753 A1* | 3/2011 | Xu | ................... | H02K 19/26 322/32 |
| 2013/0016546 A1 | 1/2013 | Mountain | | |
| 2014/0277758 A1* | 9/2014 | Wasson | ................... | H02P 6/26 700/276 |
| 2015/0008852 A1* | 1/2015 | Rastegar | ................... | H02P 6/08 318/400.04 |
| 2015/0260047 A1* | 9/2015 | Gieras | ................... | B64D 15/12 416/95 |
| 2016/0096632 A1* | 4/2016 | Veilleux, Jr. | ........... | B64D 27/10 307/9.1 |

\* cited by examiner

WOUND-FIELD GENERATOR INCLUDING ELECTRICALLY ISOLATED ENGINE ALTERNATOR

TECHNICAL FIELD

This disclosure relates generally to an electrical systems of an aircraft, and more particularly, to aircraft power systems.

BACKGROUND

In conventional aircraft engines, engine controllers, such as full authority digital engine controllers (FADECs), control certain operating characteristics of the engines to enhance the engines' performance. Traditional digital engine microcontrollers typically include a variety of sensors that measure, for example, various environmental and engine conditions such as engine temperature, engine fluid pressures, air temperature, and air density and a digital computer, known as an electronic engine control (EEC) unit. During operation of the engine, the EEC unit receives data signals from the sensors and calculates engine operating parameters based upon the data signals. Based upon the engine operating parameters, the digital engine microcontroller controls certain engine components, such as the engine's fuel system and variable geometry, to adjust the engine's fuel usage and optimize the engine's performance.

Conventional aircraft engines also include a power system to provide power to electrical components associated with the aircraft engine. The engine power systems typically include two separate isolated alternators where each alternator charges a channel of the EEC. In addition, an alternate source of EEC power can come from an airframe power source. This source is typically a battery charged by the engine power main aircraft generator or auxiliary power unit generator. The aircraft generator is independently driven by the engine and provides power for aircraft needs. These needs include systems such as utility systems, avionics, flight controls, brakes, lighting, galleys, environmental controls, and battery charging. The generators are typically controlled by a generator control unit. For the purpose of meeting Federal Aviation Administration (FAA) regulations, a conventional digital engine microcontroller, e.g., FADEC, is typically powered using the dedicated engine alternator power system. During operation, the digital engine microcontroller draws power from one or more engine alternator power systems. In the event that the alternator associated with the active channel of the digital engine microcontroller fails, the digital engine microcontroller draws power from the second continuously operating alternator power system. However, as engines continue to require additional electric power to energize more electric effectors such as all-electric actuators and pumps, the use of two redundant alternator systems without output power control can increase the overall weight, waste power, and create heat in the engine power system and can reduce reliability and aircraft payload capability.

SUMMARY

According to a non-limiting embodiment, an isolated power management system includes at least one electronic power generator with a stationary side and a rotational side. The stationary side has an exciter field stator winding, a main field stator winding, and an isolator stator winding. The rotational side rotates with respect to the stationary side and includes a rotor power converting unit. At least one digital engine microcontroller generates a first electrical excitation current and excites the exciter field stator winding to generate a first electromagnetic field. The rotor power converting unit generates a second electromagnetic field in response to being energized by the first electromagnetic field. The main field stator winding and the isolator stator winding output first and second power signals, respectively, in response to being energized by the second electromagnetic field, where the second power signal is independent and isolated from the first power signal.

According to another non-limiting embodiment, a method of powering a digital engine microcontroller of an aircraft independently from an airframe system of the aircraft comprises generating a first electrical excitation current that excites an exciter field stator winding to generate a first electromagnetic field. The method further includes generating at least one rotating electromagnetic field in response to a second electrical excitation current generated in response to the first electromagnetic field. The method further includes energizing at least one of a main field stator winding and an isolator stator winding based on the at least one rotating electromagnetic field. The main field stator winding outputs a first power signal to the airframe system in response to being energized. The isolator stator winding outputs a second power signal to the digital engine controller in response to being energized such that the second power signal is independent and isolated from the first power signal.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Various embodiments of the disclosure provide a robust, and redundant digital engine microcontroller, e.g., an electronic full authority digital engine controller (FADEC), integrated aircraft electric power management system that is isolated from engine and fuselage power supplies. The isolated power management system includes at least one electronic power generator module and at least one digital engine controller such as, for example, a FADEC, which drives the power generator module. The power generator module includes a wound-field generator having an exciter stage and a main generator stage. The exciter stage can provide power to both excite the generator field and the engine and or pylon control systems.

According to a non-limiting embodiment, the wound-field generator includes an exciter stage stator and a main stage stator. The exciter stage stator is configured to establish a field communication with the exciter stage rotor, while the main stage stator is configured to establish field communication with the main stage rotor. At least one embodiment is configured such that the exciter rotor and stator not only provide excitation for the main generator, but also provide the current to charge a capacitor for the digital engine microcontroller power. Accordingly, the digital engine microcontroller is not powered by the main generator stator output, but instead is powered by the FADEC stator output. In addition, the field current to the exciter can initially be generated by the airframe battery or other power source, but can subsequently be generated by the digital engine microcontroller. Furthermore, the digital engine microcontroller can determine the power extraction from the holdup capacitor, and can drive the exciter field based on the power extraction.

Figure 1:
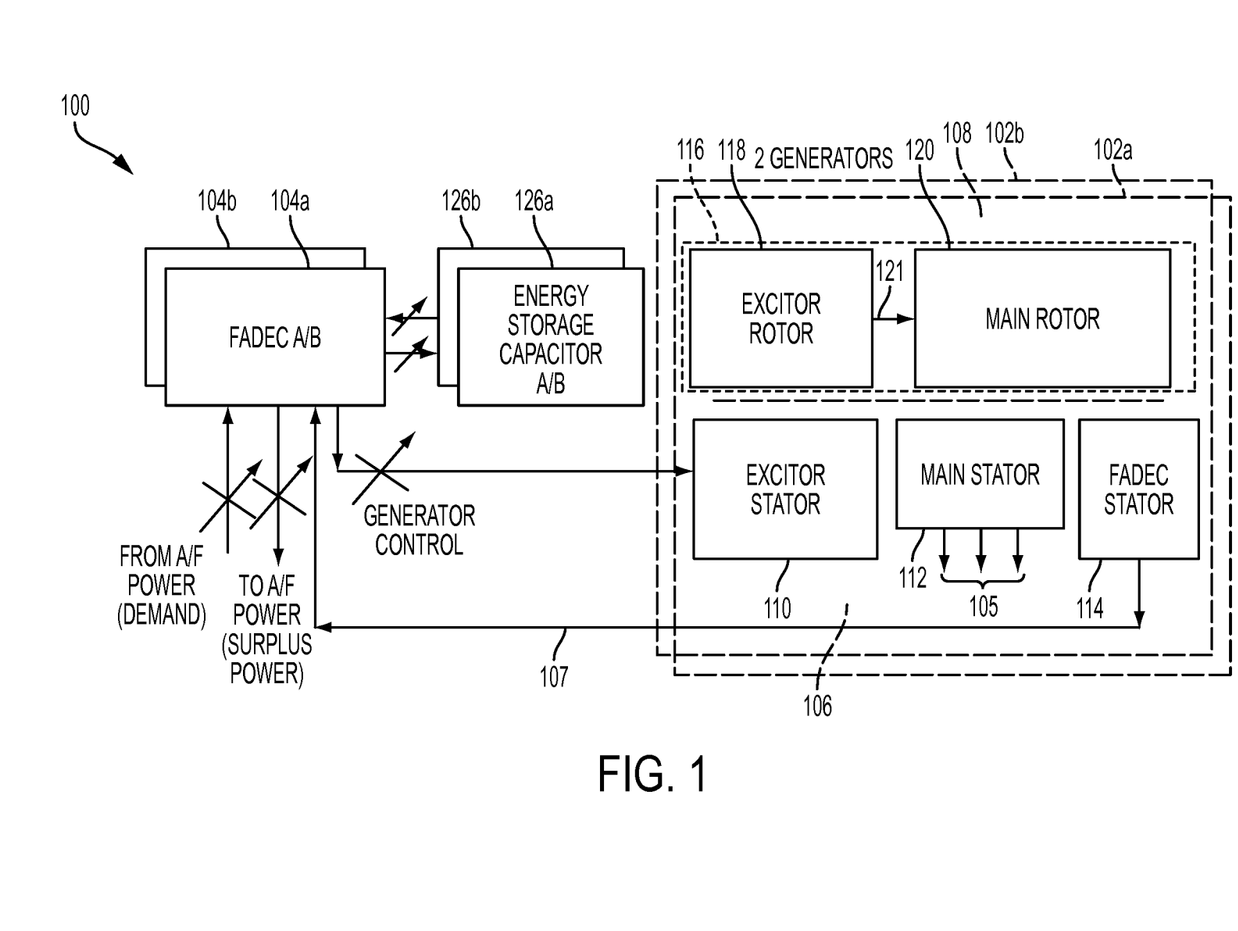
FIG. 1 is a block diagram of an isolated power management system including a pair of electronic power generator modules each controlled by a digital engine microcontroller according to a non-limiting embodiment.

With reference now to FIG. 1, an isolated power management system 100 including a pair of electronic power generator modules 102a-102b is illustrated according to a non-limiting embodiment. According to an embodiment, the isolated power management system 100 is installed in an aircraft and is configured to control power to one or more engines of the aircraft and/or the airframe (A/F) system of the aircraft. Each of the power generator modules 102a-102b is controlled by a respective digital engine microcontroller 104a-104b, respectively, such as a full authority digital engine controller (FADEC) 104a-104b, for example. The digital engine microcontroller 104a-104b includes an electronic microprocessor having electronic memory that stores computer readable instructions that when executed by the microprocessor controls, for example, the operation of the aircraft engines. The digital engine microcontroller 104a-104b is also configured to provide surplus power to the airframe system.

Although a pair of electronic generator modules 102a-102b are described, it should be appreciated that only a single electronic generator module (e.g., 102a) and single corresponding digital engine microcontroller (e.g., 104a) may be provided. However, providing a power generating module 102a-102b for each aircraft engine allows for more precise regulation of engine power as controlled by the digital engine microcontroller. The digital engine microcontroller can provide appropriate engine governing in anticipation of load demanded by the generator modules. This is a well-suited solution for high power more electric engines (MEE) and more electric aircraft (MEA) with isolated A/F power.

The power generator modules 102a-102b each includes a stationary side 106 and a rotational side 108 separated from the stationary side by an air gap (not shown). The rotational side 108 is coupled to a shaft (not shown) which is rotatably driven by a respective engine of the aircraft. In this manner, the rotational side 108 is rotated with respect to the stationary side 106.

The stationary side 106 includes an exciter field stator winding 110, a main field stator winding 112, and an isolator stator winding 114 (i.e., a FADEC stator winding). The exciter field stator winding 110 is in signal communication with a respective digital engine microcontroller 104a-104b to receive a first electrical excitation current. The main field stator winding 112 and the isolator stator winding 114 are installed separately from one another on the stationary side. In this manner, the main field stator winding 112 outputs a first power signal, and the isolator stator winding outputs a second power signal that is independent and isolated from the first power signal as discussed in greater detail below. According to an embodiment, the isolator stator winding 114 is capable of high dielectric open circuit voltage for surplus conditions. The isolator stator winding 114 communicates with the digital microcontroller 104a via line 107.

The rotational side 108 comprises a rotor power converting unit 116. The rotor power converter 116 includes an exciter armature (rotor) winding 118 and a main field rotor winding 120. According to an embodiment, the digital engine microcontroller 104a-104b generates a first electrical current signal (i.e., a first exciter current) to the exciter field stator winding 110. The first exciter current flowing through the exciter field stator winding 110 induces an AC voltage in the exciter armature (rotor) winding 118 located on rotating portion 108. The AC voltage generated by the exciter armature (rotor) winding 118 is rectified by rotor power converting unit 116 to generate a DC voltage that is supplied to the main field rotor winding 120 via DC bus link 121.

Figure 2:
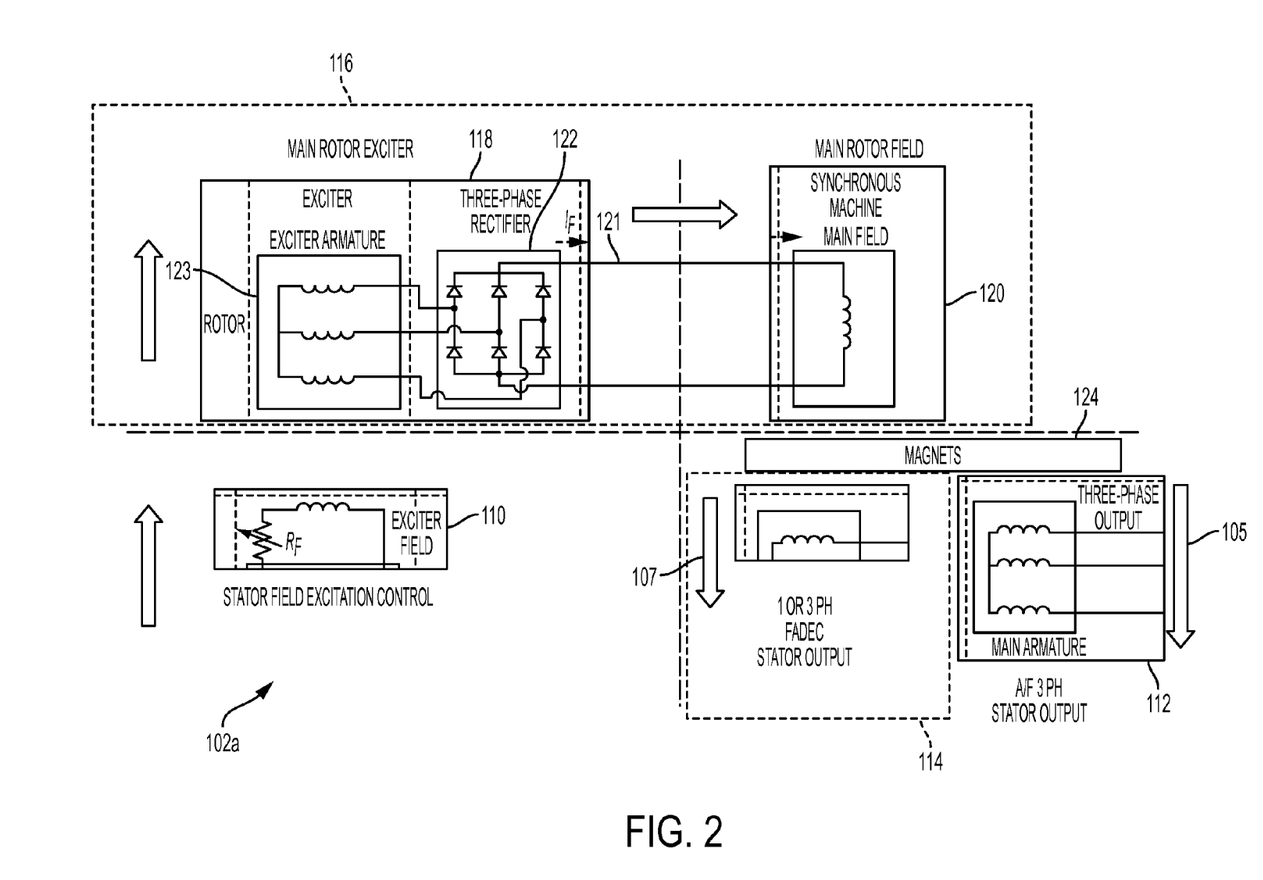
FIG. 2 is an electrical schematic diagram of the power generator circuit illustrated in FIG. 1 according to a non-limiting embodiment.

Referring to FIG. 2, for example, the exciter armature (rotor) winding 118 includes a three-phase winding 122, and a rotating rectifier 123. The exciter armature (rotor) winding 118 may be separated from the three-phase winding via one or more permanent magnets (PMs) 124. The three-phase winding 122 outputs a three-phase AC output voltage in response to the first electromagnetic field. The rotating rectifier 123 is configured to rectify the AC output voltage to generate a DC voltage that is supplied to main field (rotor) winding 120 via the DC bus link 121. The rotating rectifier 123 may be constructed in various ways including, for example, as a 6-pulse passive rectifier comprised of a plurality of bridge-connected diodes, or an active rectifier in which the diodes are connected in parallel with a plurality of solid-state switches that are selectively controlled to provide a DC output to the main field (rotor) winding 120.

In response to the DC voltage, the main field rotor winding 120 generates a second electromagnetic field (i.e., a rotating electromagnetic field). According to at least one embodiment, the second electromagnetic field excites both the main field stator winding 112 and the isolator stator winding 114. Each of the main field stator winding 112 and the isolator stator winding 114 can be constructed as a single phase winding that outputs respective single-phase power signals, or as a three-phase winding that outputs a three-phase power signal. Accordingly, the main field stator winding 112 outputs a first power signal 105 (e.g., a three-phase power signal), and the isolator stator winding 114 outputs a second power signal 107 that is independent and isolated from the first power signal. In order to regulate output power to the aircraft the exciter current to the exciter stator 110 can be increased or decreased to achieve the desired level of output power from main field stator winding 112. By increasing the current, the power from main field stator winding 112 is increased, and by decreasing the current to exciter stator 110, the power from main field stator winding 112 is decreased. This output can be monitored and regulated with current and voltage sensors and provided directly to the digital engine microcontroller with isolated coupled means.

The isolated power management system 100 may further include an energy storage device 126a-126b (FIG. 3) in signal communication with a respective digital engine microcontroller 104a-104b. The energy storage device 126a-126b includes at least one of a battery or capacitor configured at least one of absorb energy or discharge energy in response to an electrical transient event. In addition, the energy storage device 126a-126b provides local auxiliary power to the digital engine controller when necessary.

According to another embodiment, the rotational side 108 (FIG. 1) includes a permanent magnet (PM) (not shown in FIG. 1) that rotates with respect to the stationary side 106, an in particular the isolator stator winding 114. In this manner, the main field stator winding 112 outputs a first power signal in response to the second electromagnetic field generated by the main field rotor winding 120, while the isolator stator winding 114 outputs a second power signal, which is independent and isolated from the first power signal, in response to a magnetic field (e.g., a rotating magnetic field) generated by the PM as discussed in greater detail below.

Figure 3:
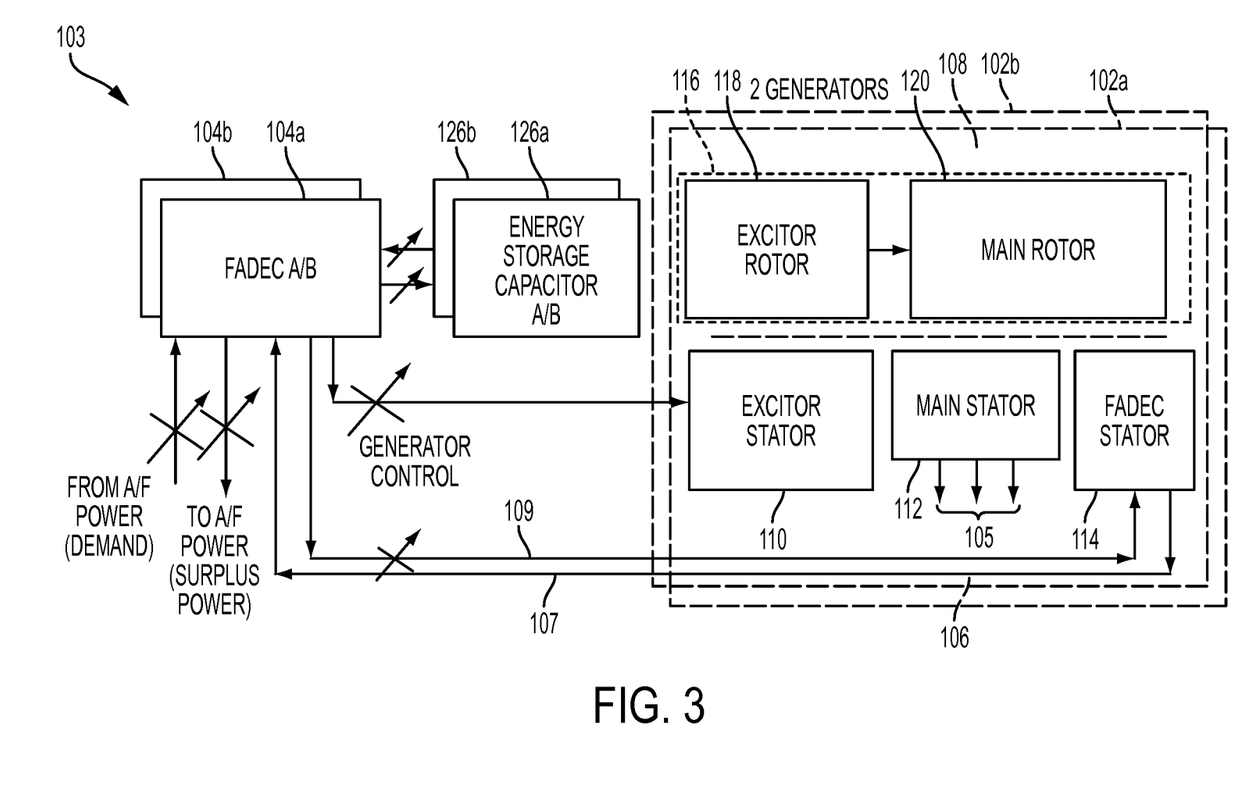
FIG. 3 a block diagram of an isolated power management system including a pair of electronic power generator modules each controlled by a digital engine microcontroller according to another non-limiting embodiment.
Figure 4:
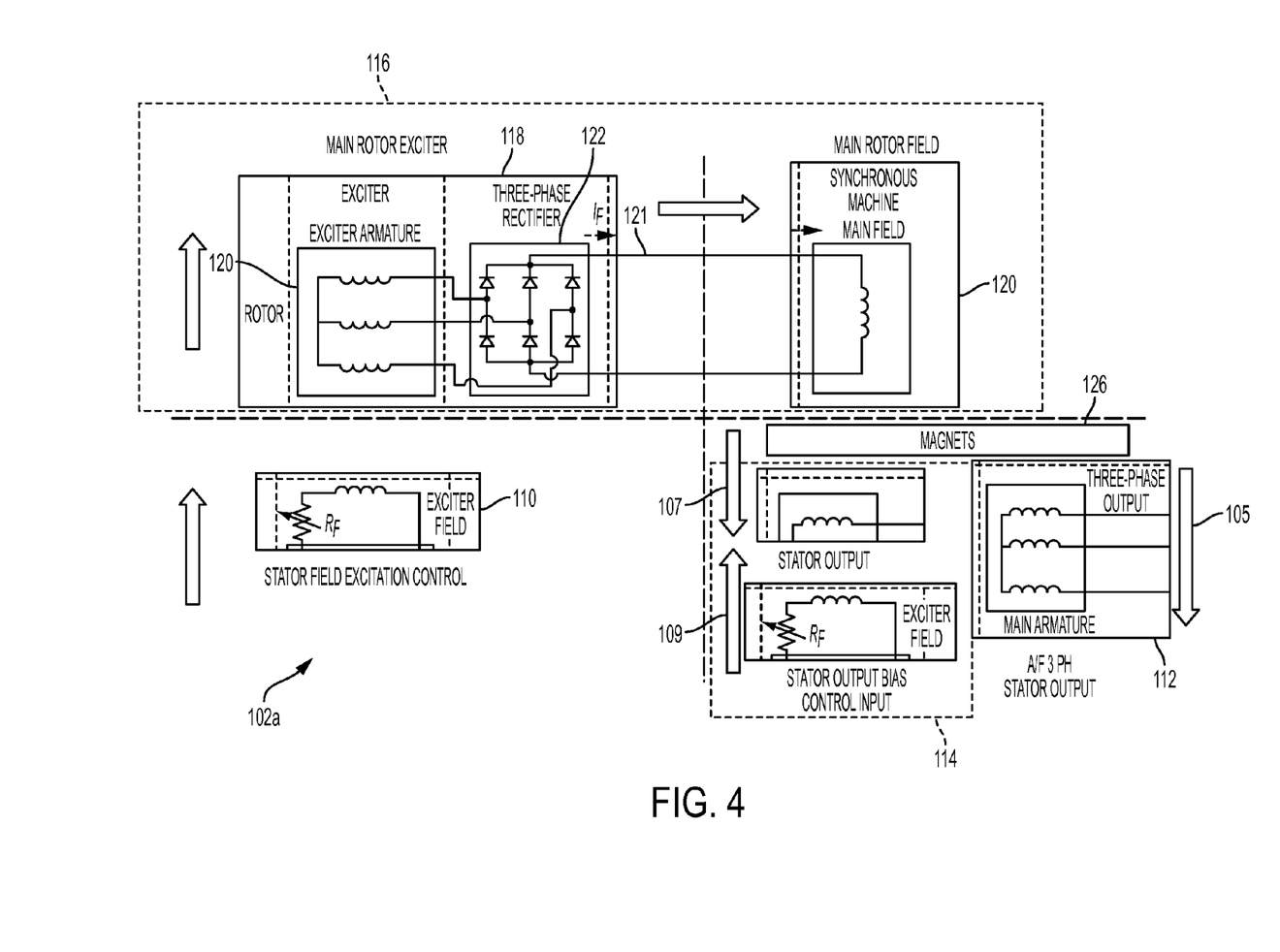
FIG. 4 is an electrical schematic diagram of the power generator circuit that illustrated in FIG. 3 according to a non-limiting embodiment.

Referring now to FIGS. 3 and 4, an isolated power management system 103 drive including an electrically isolated digital engine microcontroller 104a-104b is illustrated according to another non-limiting embodiment. The isolated power management system 103 illustrated in FIGS. 3 and 4 is similar to the previously embodiments shown, but further includes a feature where one or more of the digital engine microcontrollers 104a-104b output a bias signal 109 to a respective isolator stator winding 114. The bias signal 109 adjusts the output from the isolator stator winding 114 power signal received by the digital engine microcontroller. In this manner power delivered to the airframe system and the digital engine microcontroller can be matched with power demand to one or more engines of the aircraft and the aircraft. This bias signal 109 controlling the isolator stator winding's 114 output works in coordination with the overall excitor field winding stator current to exciter stator 110 thereby providing the required overall power to the engine and airframe through isolated power outputs through the main field stator winding 112 and isolator stator winding 114. In addition high response engine power demands can be accommodated with the energy storage devices, e.g., capacitors 126a-126b which can both source and sink power. Alternatively, power can always be sourced via backup/ emergency power to the digital engine microcontroller from the airframe.

Figure 5:
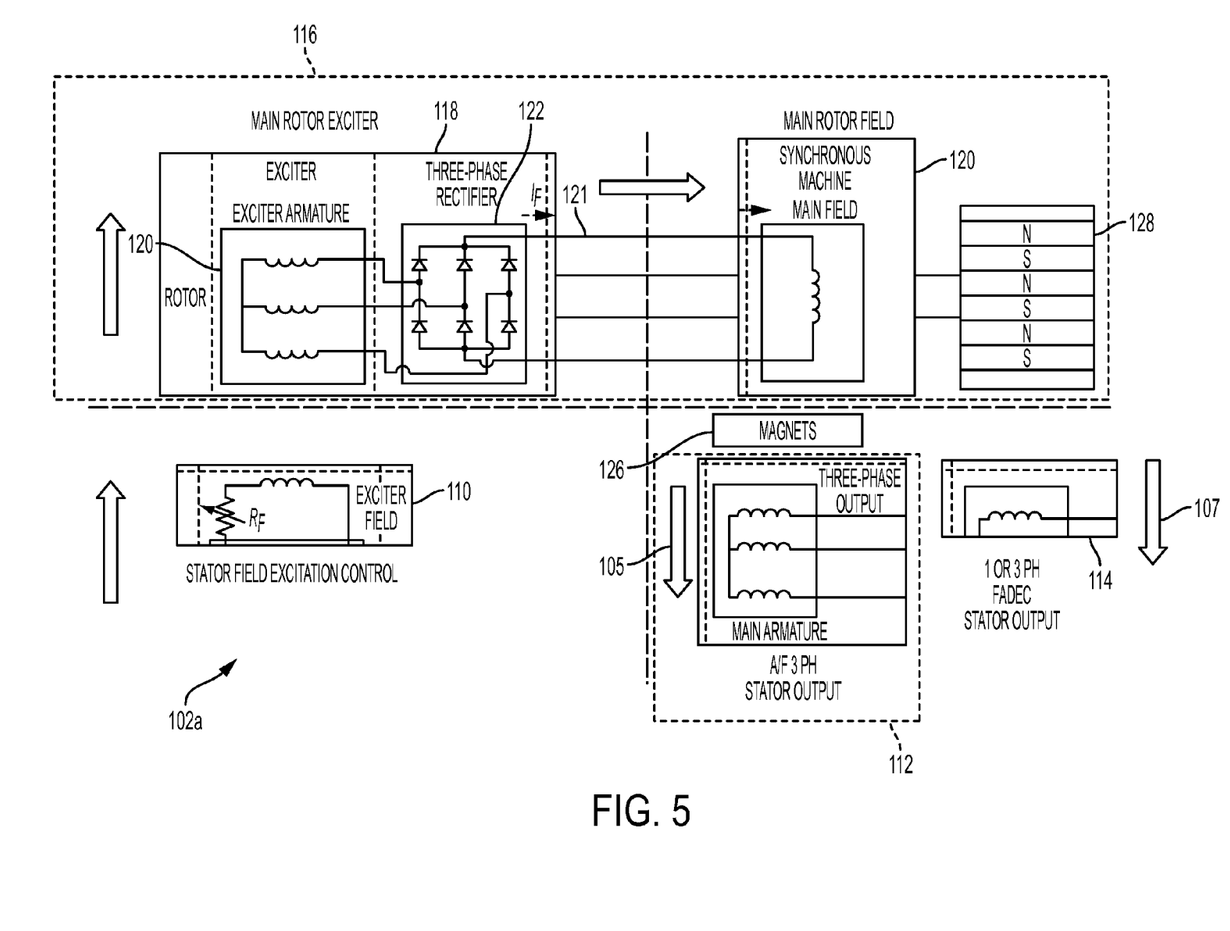
FIG. 5 is an electrical schematic diagram of a power generator circuit that is driven by a digital engine microcontroller according to another non-limiting embodiment.

Turning now to FIG. 5, a power generator module 102a capable of being driven by a digital engine microcontroller 104a (FIG. 1) is illustrated according to another non-limiting embodiment. The power generator module 102a operates similar to the aforementioned power generating circuit of FIGS. 1-4. According to at least one embodiment, however, the power generator module 102a includes a rotor permanent magnet (PM) assembly 128 installed on the rotational side 108 (FIG. 1) of the power generator module 102a. The PM assembly 128 may include a single PM, or a plurality of magnets that are stacked in an alternating polar arrangement (e.g., N,S,N,S, etc.). According to at least one embodiment illustrated in FIG. 5, the PM assembly 128 rotates with respect to the stationary side 106 (FIG. 1) and generates a rotating magnetic field, i.e., a third electromagnetic field different from the electromagnetic field generated by the main field (rotor) winding 120. In this manner, the main field stator winding 112 outputs a first power signal in response to being energized by the second electromagnetic field, and the isolator stator winding 114 outputs a second power signals in response to being energized by a third electromagnetic field generated by the rotating PM assembly 128. Here the isolator stator winding 114 is shown as constructed as a single phase winding that outputs single-phase power signals. Accordingly, the first power signal is output to an airframe system of the aircraft, and the second power signal is output to the at least one digital engine controller 104a-104b such that the at least one digital engine controller 104a-104b (FIG. 1) is powered independently from the A/F system.

As illustrated in FIG. 5, at least one embodiment provides a digital engine microcontroller driven brushless exciter circuit. The digital engine microcontroller driven brushless circuit includes a power supply having a field circuit of the exciter, which is located on the stator. The output of the armature circuit of the exciter (on the rotor) is then rectified and used to supply the field current to drive the stator of the airframe (A/F) system. The digital engine microcontroller is driven by the permanent magnet rotor independent of the main engine generators.

Accordingly, various embodiments described above provide an isolated power management system 100 (FIG. 1) that includes main field stator winding and the isolator stator winding which output first and second power signals, respectively, in response to being energized by the second electromagnetic field. Unlike conventional aircraft power management systems, however, the second power signal is independent and isolated from the first power signal. Accordingly, a simple, robust, and redundant digital engine microcontroller integrated aircraft electric power generation is provided that is separate from engine and A/F power supplies. In addition, at least one embodiment provides capabilities for windmill bootstrap in-flight re-start of main engine. Further, at least one embodiment provides capabilities for dynamic transient control and energy balancing. In addition, at least one embodiment provides capabilities for excited coil control for exciter PM output. Further, at least one embodiment provides capabilities for airframe power at sub-start to bootstrap system for ground and/or in-flight engine re-start.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An isolated power management system, comprising at least one electronic power generator including:
  a stationary side having an exciter field stator winding, a main field stator winding, and an isolator stator winding;
  a rotational side that rotates with respect to the stationary side, the rotational side including a rotor power converting unit; and
at least one digital engine microcontroller that generates a first electrical excitation current and excites the exciter field stator winding to generate a first electromagnetic field, the rotor power converting unit configured to generate a second electromagnetic field in response to being energized by the first electromagnetic field, wherein the main field stator winding and the isolator stator winding output first and second power signals, respectively, in response to being energized by the second electromagnetic field, the second power signal being independent and isolated from the first power signal.

2. The isolated power management system of claim 1, wherein the at least one electronic power generator and the at least one digital engine microcontroller are installed on an aircraft, the at least one digital engine microcontroller including an electronic microprocessor having electronic memory that stores computer readable instructions that when executed by the microprocessor controls operation of at least one engine of the aircraft.

3. The isolated power management system of claim 2, wherein the first power signal is output to an airframe system of the aircraft, and the second power signal is output to the at least one digital engine controller such that the at least one digital engine controller is powered independently from the airframe system.

4. The isolated power management system of claim 2, wherein the rotor power converting unit comprises:
    an exciter armature rotor winding that generates a second electrical excitation current in response to the first electromagnetic field; and
    a main field rotor winding that generates the second electromagnetic field in response to the second electrical excitation current.

5. The isolated power management system of claim 4, wherein the exciter armature rotor winding comprises:
    a three phase winding that outputs a three-phase AC output voltage in response to the first electromagnetic field; and
    a rotating rectifier configured to rectify the AC output voltage to generate a DC voltage that is supplied to main field rotor winding via DC bus link.

6. The isolated power management system of claim 5, wherein the rotating rectifier includes one of a 6-pulse passive rectifier comprised of a plurality of bridge-connected diodes.

7. The isolated power management system of claim 6, wherein the main field stator winding includes a three-phase winding that outputs a three-phase power signal to the airframe system.

8. The isolated power management system of claim 1, further comprising at least one electronic energy storage device in signal communication with the digital engine microcontroller, the electronic energy storage device including at least one of a battery or capacitor configured at least one of absorb energy or discharge energy in response to an electrical transient event, and provide local auxiliary power to the digital engine controller.

9. The isolated power management system of claim 3, wherein the at least one digital engine microcontroller outputs a bias signal to the isolator stator winding that adjusts the output from the main field rotor winding to the isolator stator winding to control the second power signal received by the digital engine microcontroller, thereby matching power delivered to the airframe system and power delivered to the at least one engine of the aircraft.

10. The isolated power management system of claim 5, further comprising a permanent magnet (PM) separating the main field rotor winding from the main field stator winding and the isolator stator winding.

11. An isolated power management system, comprising at least one electronic power generator including:
    a stationary side having an exciter field stator winding, a main field stator winding, and an isolator stator winding;
    a rotational side that rotates with respect to the stationary side, the rotational side including a rotor power converting unit and at least one rotating permanent magnet (PM) assembly; and
    at least one digital engine microcontroller that generates a first electrical excitation current to excite an exciter field stator winding to generate a first electromagnetic field, the rotor power converting unit configured to generate a second electromagnetic field in response to being energized by the first electromagnetic field,
    wherein the main field stator winding outputs a first power signal in response to being energized by the second electromagnetic field, and the isolator stator winding outputs a second power signals in response to being energized by a third electromagnetic field generated by the rotating PM assembly.

12. The isolated power management system of claim 11, wherein the first power signal is output to an airframe system of an aircraft, and the second power signal is output to the at least one digital engine controller such that the at least one digital engine controller is powered independently from the airframe system.

13. A method of powering a digital engine microcontroller of an aircraft independently from an airframe system of the aircraft, the method comprising:
    generating a first electrical excitation current that excites an exciter field stator winding to generate a first electromagnetic field;
    generating at least one rotating electromagnetic field in response to a second electrical excitation current generated in response to the first electromagnetic field; and
    energizing at least one of a main field stator winding and an isolator stator winding based on the at least one rotating electromagnetic field, the main field stator winding outputting a first power signal to the airframe system in response to being energized, and the isolator stator winding outputting a second power signal to the digital engine controller in response to being energized, the second power signal being independent and isolated from the first power signal.

14. The method of claim 13, further comprising exciting a main field rotor winding in response to the second electrical excitation current to generate a single rotating electromagnetic field that energizes both the main field stator winding and the isolator stator winding.

15. The method of claim 13, further comprising exciting a main field rotor winding in response to the second electrical excitation current to generate a first rotating electromagnetic field that energizes the main field stator winding, and rotating a permanent magnet (PM) with respect to the isolator stator winding to generate a second rotating electromagnetic field that energizes the isolator stator winding.

* * * * *